Figure 1:
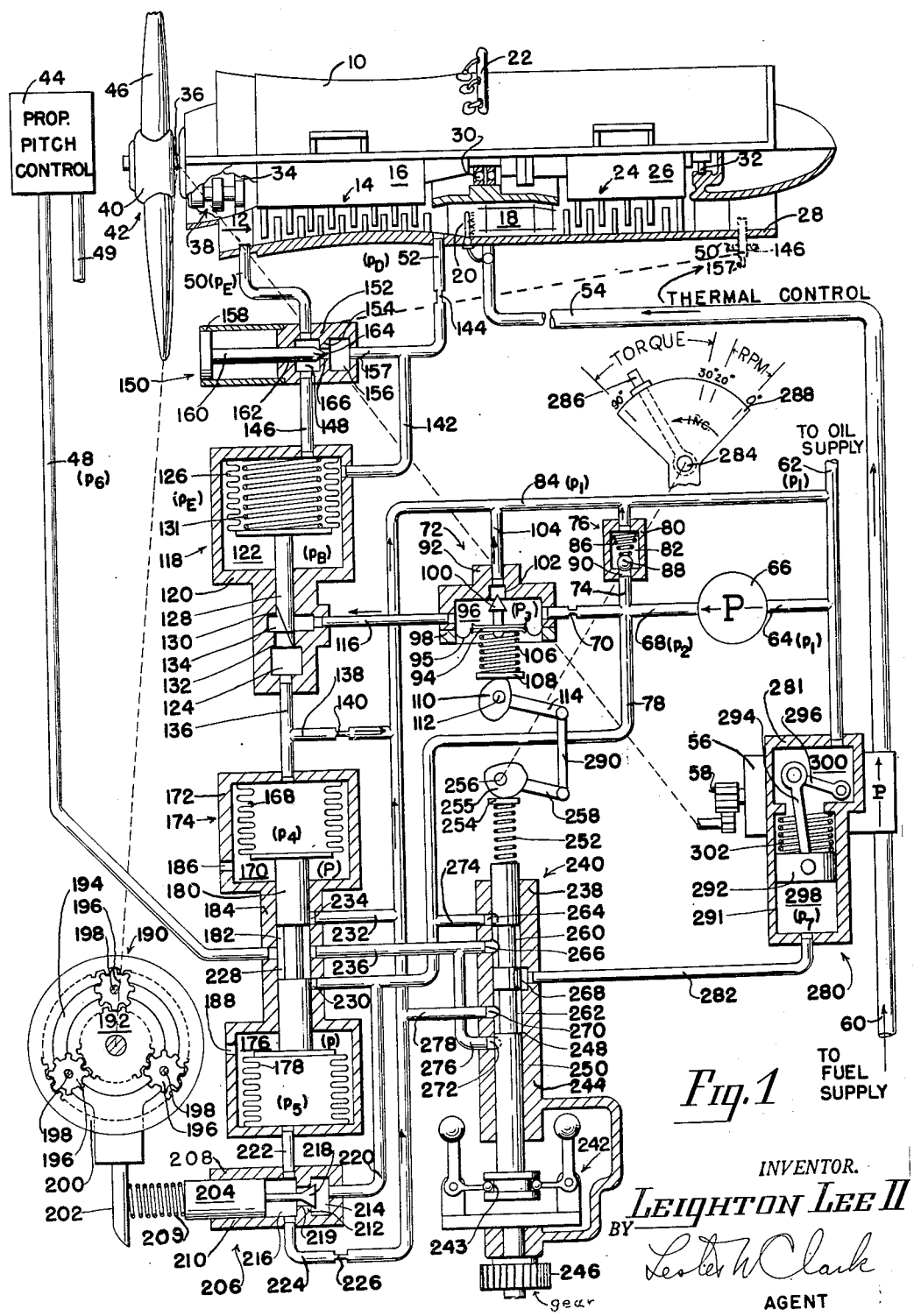

INVENTOR.
*Leighton Lee II*
BY *Lester W Clark*
AGENT

May 18, 1954

L. LEE II 2,678,698

FUEL AND TORQUE CONTROL APPARATUS
FOR AIRCRAFT PROPULSION SYSTEMS

Filed Nov. 15, 1946

2 Sheets-Sheet 2

INVENTOR.
LEIGHTON LEE II
BY
Lester W Clark
AGENT

Patented May 18, 1954

2,678,698

UNITED STATES PATENT OFFICE 2,678,698

FUEL AND TORQUE CONTROL APPARATUS FOR AIRCRAFT PROPULSION SYSTEMS

Leighton Lee II, Rocky Hill, Conn., assignor, by mesne assignments, to Niles-Bement-Pond Company, West Hartford, Conn., a corporation of New Jersey Application November 15, 1946, Serial No. 710,023

24 Claims. (Cl. 170—135.74)

The present invention applies to fuel and torque control apparatus for internal combustion engines, inclusive of gas turbine engines and combination gas-turbine-and-jet engines.

The particular embodiment of my invention, as described in the appended specification, is intended for control of fuel delivered to an internal combustion engine suitable for propeller-propulsion or combined propeller-and-jet propulsion of aircraft; and for control of the propeller torque. In general, it may be assumed that the propeller used with such an engine absorbs substantially the total brake-horsepower of the engine and that the ratio of propeller torque to engine torque is constant. This assumption applies to the particular embodiment of the invention herein described, but the invention is not so limited.

An internal combustion engine such as is referred to herein includes a compressor, one or more combustion chambers, a turbine, and a tailpipe, in the stated order of arrangement. Associated with the engine is a fuel pump for delivering fuel to the combustion chamber and, connected to the compressor shaft, there is a gear train driving a propeller shaft and a propeller at a speed less than engine speed.

Ideal fuel requirements of this type engine are determined by proper analysis of empirical data which show the desired relationship of engine speed, fuel flow, brake-horsepower, altitude, temperature, and other factors, to each other. A measured indication of mass air flow thru the engine may be employed as one means of obtaining fuel flow control. The significance of the fuel-air ratio, however, is less apparent than when dealing with reciprocating engines, owing to metallurgical and structural limitations which prevent safe operation at speeds and temperatures exceeding predetermined limiting values. Engine speed and temperature vary in response to a wide variety of conditions which include brake-horsepower and engine torque, and it is desirable to maintain the respective values of speed and temperature in definite relationship with limiting values thruout the range of operation. Therefore, the fuel flow may be made a continuous function of engine speed and temperature.

Because a fixed-pitch propeller cannot perform equally well under all conditions of flight, it is customary to employ variable pitch propellers. It is then possible to obtain relatively high propeller efficiency with a low-pitch setting under conditions of take-off and climb at relatively high engine speed and power; and to obtain correspondingly high efficiency with a higher pitch setting under normal conditions of cruising speeds and power. Variable pitch propellers are used to obtain constant engine speed, when desired. For a given condition of engine speed and brake-horsepower, engine torque varies according to the relation:

$$T = \frac{k \text{ B. H. P.}}{\text{R. P. M.}}$$

in which T, k, B. H. P., and R. P. M. are respectively the engine torque, a constant, the engine brake-horsepower, and the engine speed. Propeller efficiency is defined as the ratio of thrust-horsepower to engine brake-horsepower and is a function of pitch and propeller characteristics, whence variable pitch control affords means whereby the relationship between engine speed, brake-horsepower, and torque may be controlled in flight.

It is an object of the present invention to provide improved control apparatus for regulating both the fuel flow and the torque of an internal combustion engine.

Another object is to provide, in apparatus of the type described, improved means for regulating both the fuel flow and the torque as functions of an air pressure in the engine which is a measure of the mass air flow therethru.

Another object of this invention is to provide in such apparatus improved means, including a single manually operated lever, for controlling both fuel flow and torque to satisfy particular operational requirements of speed and torque.

It is a further object of my invention to provide improved fuel and torque control apparatus of simple design whereby the engine may be operated at constant maximum speed and varying load.

Figure 2:
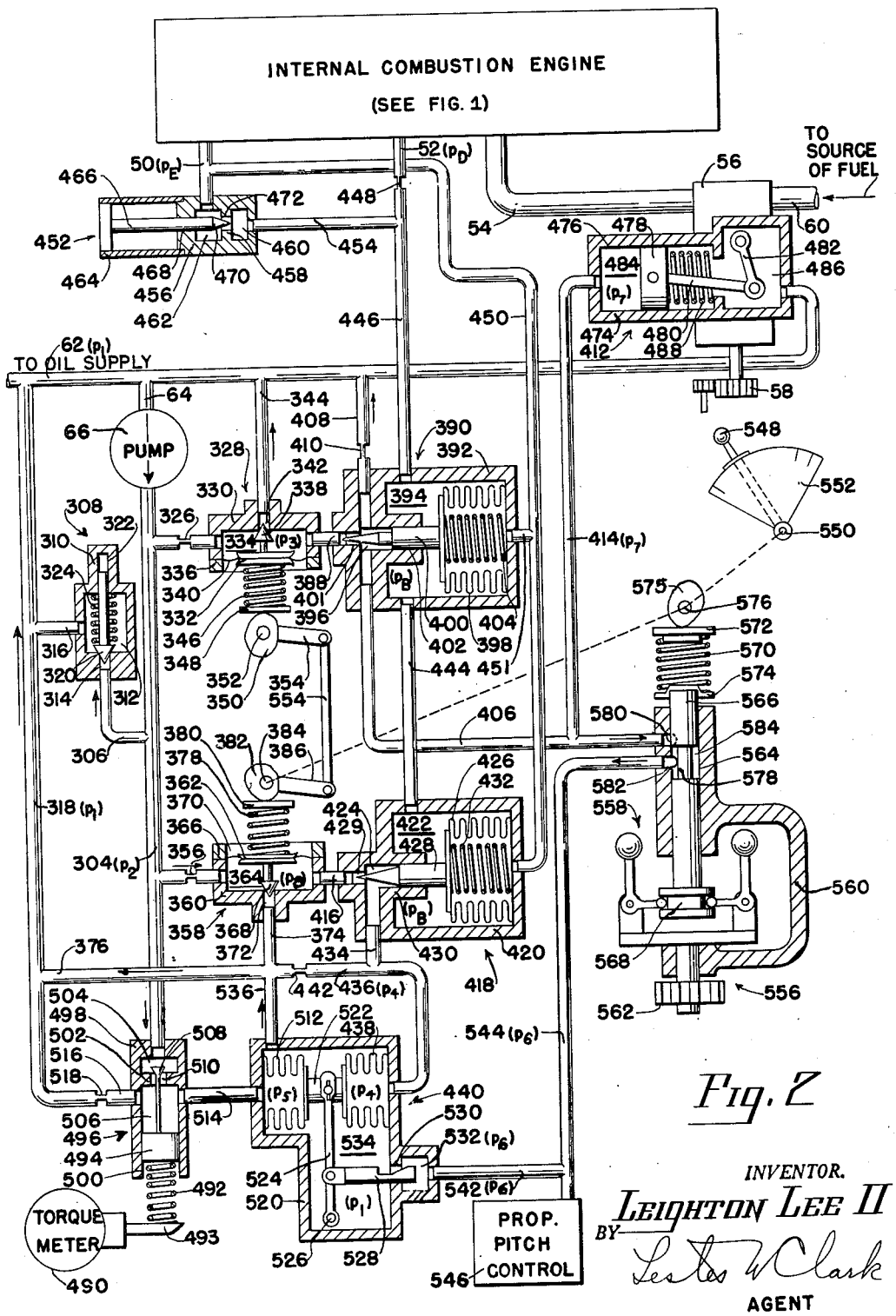

Other objects and advantages of the present invention will become apparent from a consideration of the appended specification, claims, and drawings, in which:

Figure 1 illustrates, somewhat diagrammatically, fuel and torque control apparatus embodying the principles of my invention and the relationship of such apparatus, an internal combustion engine and associated means which include a fuel pump and a pitch control mechanism; and Figure 2 illustrates, also somewhat diagrammatically, another embodiment of my invention and its principal connections with the engine and associated means of Figure 1.

FIGURE 1

Referring to the drawing, Figure 1, there are shown the principal elements of an internal combustion engine suitable for propeller-propulsion or propeller-and-jet propulsion of aircraft, as follows: a supporting casing 10, an air inlet 12, a multi-stage compressor indicated as 14, a compressor rotor shaft 16, a combustion chamber 18, a number of fuel discharge nozzles one of which is designated 20, a generally circular manifold 22, a multi-stage turbine indicated as 24, a turbine rotor shaft 26 connected to the compressor rotor shaft 16, a tailpipe 28 for discharge of combustion gases from turbine 24, a center bearing 30 and end bearings 32 and 34 supported by casing 10, a propeller shaft 36, and a gear train 38 connecting shaft 36 to shaft 16.

In the hub 40 of the propeller generally shown as 42, there is an hydraulically operated pitch-control diagrammatically shown as 44, for varying the pitch of the propeller blades 46. Pitch control 44 is connected by a conduit 48 to the control apparatus subsequently described, and by another conduit 49 to a convenient source of engine oil.

A tube 50 is connected to the engine and supplies air to the control apparatus at the static pressure ($p_E$) in air entrance 12. Similarly, a tube 52 is connected to the engine and supplies air to the control apparatus at the static pressure ($p_D$) downstream from compressor 14.

A compressor pressure differential is thus obtained which is a function of the compressor characteristics, the engine speed, air entrance pressure and temperature, and variable conditions downstream from the compressor, including variations in combustion temperature, in the fuel flow to the engine, and in the brake-horsepower. The differential is an indication of air flow thru the engine; assuming constant engine speed, the differential decreases as altitude increases or as entering air density decreases, and it also decreases as the combustion temperature increases.

The fuel manifold 22 in the engine is connected by a conduit 54 to a variable delivery fuel pump 56. Pump 56 is driven by the engine thru gearing 58 and is connected to a source of fuel by a fuel inlet conduit 60.

Referring to the control apparatus of Figure 1, there is shown an oil supply conduit 62 for the flow of engine lubricating oil, at a pressure ($p_1$), to an inlet conduit 64 and thence to a pump 66 having a constant delivery at any given speed. Pump 66 may be driven by the engine and has sufficient capacity to provide high pressure at low starting speeds. From the pump oil flows at superatmospheric pressure thru a conduit 68, whence the course of flow is briefly described as follows: a first path of flow from conduit 68 includes a conduit 74, a by-pass valve mechanism 76, and a drain conduit 84 connected to supply conduit 62; elements 68, 74, 76, 84, and 62 being connected in series in the order stated. A second path of flow from conduit 68 includes a restriction 70 and a chamber 96 in a pressure regulator 72. The flow from chamber 96 is divided thus: part of the oil entering chamber 96 flows therefrom thru a valve seat 102 in pressure regulator 72, then thru a conduit 104 connected to seat 102 and thence to drain conduit 84; and the remainder of oil entering chamber 96 flows thru a conduit 116, a control valve mechanism 118, a conduit 136, another conduit 138 having therein a fixed restriction 140, and drain conduit 84; elements 96, 116, 118, 136, 138, and 84 being connected in series in the order stated. Conduit 68 is also connected to a conduit 78 for flowing oil to elements of the fuel control hereinafter described.

The by-pass valve mechanism 76 comprises a body 80 having a chamber 82 therein. A valve seat 90 is in body 80 at the lower end of chamber 82 and is connected to conduit 74. The upper end of chamber 82 is connected to conduit 84. A spring 86 is in compression between the upper end of chamber 82 and a valve 88 which is forced by spring 86 toward seat 90, thereby tending to restrict flow thru the seat with a substantially constant spring force. In consequence of the action of valve 88, the by-pass valve mechanism 76 maintains a substantially constant superatmospheric pressure ($p_2$) in conduit 68, the value of which pressure depending on the rate and initial loading of spring 86.

The pressure regulator 72 includes a body 92 and a diaphragm assembly 94, which together form chamber 96. A diaphragm 95 in assembly 94 is held in position by a diaphragm retainer 98. A valve 100 is attached to the diaphragm assembly 94 and is operable in response to movement of assembly 94 to vary the effective area of flow thru valve seat 102. A spring 106, in compression between diaphragm assembly 94 and a retainer 108, tends to move valve 100 toward seat 102. The closing force on valve 100 due to the pressure differential thereacross is negligible. Valve 100 is therefore subject to opposite forces; namely, a spring force tending to close it, and an opening force produced by the pressure differential acting on diaphragm assembly 94.

Since the lower side of diaphragm 95 is vented to atmosphere, it follows that in a condition of equilibrium the gage pressure ($p_3$) in chamber 96 is proportional to the load imposed by spring 106 tending to seat valve 100. For every fixed position of spring support 108 there is a corresponding substantially constant spring load and hence a corresponding substantially constant value of the pressure ($p_3$). The control apparatus is not limited to use of atmospheric pressure for balancing diaphragm 95, as other preferably low pressures are suitable and may be used, if desired.

The particular value of pressure ($p_3$) in chamber 96 is controlled by the position of support 108 which is operable by a cam 110 to vary the deflection of spring 106. Cam 110 is mounted on a shaft 112 which is rotatable thru an arc of predetermined length by a manually controlled lever 114.

Both the volume and the pressure of oil flowing from the by-pass valve mechanism 76 are subject to wider variations than the corresponding volume and pressure of oil flowing from the pressure regulator 72. Regulator 72 is therefore of relatively smaller capacity and greater regulating accuracy than the mechanism 76. A single valve could perform the functions of both valve mechanisms 72 and 76; but, if located at the pump, a long and complicated valve control mechanism would be required; and, if such a single valve was located at the control apparatus, long and high-capacity lines to the pump would be necessary. The arrangement shown in Figure 1 is well adapted to an installation in which the fluid pump is remotely located in respect to the rest of the control apparatus.

Control valve mechanism 118 includes a housing 120 having therein an upper chamber 122 and a lower chamber 124. A bellows 126 is fixed to body 120 in the upper end of chamber 122 and is connected to a valve 128 which operates in a guide 130 in body 120 at the lower end of chamber 122. The end of valve 128 is contoured and is operable in response to contraction of bellows 126 in opposition to a spring 131 to increase the effective area of a valve seat 132 at the upper end of chamber 124. An inlet chamber 134 is formed in body 120 between the lower end of guide 130 and the upper side of seat 132. Chamber 134 is connected to conduit 116 and chamber 124 is connected to conduit 136. The pressure ($p_4$) in conduits 136 and 138 is regulated as a function of the value of pressure ($p_3$), the contour of valve 128, and the position of valve 128 relative to its seat 132. The pressure ($p_4$) increases as the pressure ($p_3$) increases or as the area of flow past valve 128 increases and hence as bellows 126 collapses.

The chamber 122 is connected by a conduit 142 to another conduit 157 and thru a restriction 144 to the compressor discharge pressure tube 52. The exterior of bellows 126 is thereby always subject to the pressure designated ($p_B$) in conduit 142 and chamber 122. The interior of bellows 126 is connected by a conduit 146 to entrance pressure tube 50 thru an outlet chamber 148 in a thermal control generally indicated as 150, and is always subject to the pressure ($p_E$).

Thermal control 150 comprises a body 152 having a wall 154 separating outlet chamber 148 from an inlet chamber 156 which is connected to conduit 157. One end of a thin walled tube 158 is fixed to the closed end of body 152 nearest chamber 148; and has attached to its other end, which is closed, a rod 160 which is slidable in a centrally located aperture 162 in the end of body 152 to which tube 158 is fixed. The free end of rod 160 is contoured to form a valve 164, which is operable in a seat 166 in wall 154. Tube 158 and rod 160 are made from materials having substantially different coefficients of thermal expansion and the unit is installed in the engine with tube 158 exposed to the temperature of combustion gases in the tailpipe, as shown diagrammatically, or in some other desired location. As the temperature increases, the tube 158 expands faster than the rod 160, thereby increasing the effective area of opening between valve 164 and seat 166. Generally, control 150 is made so that the valve remains closed until a limiting value of temperature is exceeded.

When valve 164 is closed, as is normally true, the pressure in chamber 122 outside bellows 126 is the same as the pressure in conduits 142 and 157 and tube 52, there being no flow thru restriction 144; hence the pressure ($p_B$) =the pressure ($p_D$) when valve 164 is closed. Since the pressure inside bellows 126 is always the pressure ($p_E$) in tube 50, then in normal operation below the limiting temperature bellows 126 is subject to the pressure differential ($p_D - p_E$).

When valve 164 is open, however, as is the case when the value of limiting temperature is exceeded, flow occurs thru tube 52, restriction 144 and conduit 157, past valve 164 and into tube 50. The pressure in conduit 157 and hence the pressure in conduit 142 is then less than that in tube 52, because of the pressure drop across restriction 144, the pressure decrease being a function of the respective areas of restriction 144 and of the opening past valve 164. When the valve is open, therefore, the pressure ($p_B$) is less than the pressure ($p_D$) and the bellows is subject to the pressure differential ($p_B - p_E$) which, in this case, is less than the differential ($p_D - p_E$).

The travel ($t$) of valve 128 in response to changes in the value of the differential ($p_D - p_E$) is expressed as follows, when valve 164 is closed:

$$t = \frac{S - (p_D - p_E)A}{s}$$

in which (S) is the load on spring 131 corresponding to a reference position of valve 128 at which the travel ($t$) is considered equal to zero, (s) is the rate of spring 131, (A) equals the effective area of bellows 126, and in which downward movement of the valve is designated by a positive value of ($t$). Thus, for each value of the pressure differential ($p_D - p_E$) there is a corresponding position of the valve and hence a corresponding value of the effective area of valve opening, depending upon the contour of valve 128. For a given contour, when the temperature does not exceed the predetermined limiting value at which thermal control valve 164 opens, it follows that the pressure ($p_4$) in conduit 136 varies as a function of the pressure ($p_3$) and the pressure differential ($p_D - p_E$).

Conduit 138 has its lower end connected to the interior of a bellows 168 which has its upper end fixed to the upper end of a chamber 170 in a body 172 of a pitch control pressure regulator indicated as 174. In the lower end of body 172 there is another chamber 176 having a bellows 178 fixed to its lower end, bellows 168 and 178 being symmetrically disposed to each other in body 172 and being connected by a valve 180 which is operable in a guide 182 provided in a centrally located constriction 184 in body 172. Bellows 168 and 178 are identical in the embodiment of Figure 1 but may be of different sizes, if necessary, to satisfy particular requirements of design or operation. Both chambers 170 and 176 are vented to the atmosphere as shown, or to any other suitable common pressure source, thru vents 186 and 188, respectively. Valve 180 has a neutral position at which it remains in equilibrium when the pressure ($p_4$) in bellows 168 is equal in value to the pressure ($p_5$) in bellows 178, assuming bellows 168 and 178 to be of equal effective area.

The pressure ($p_4$) is applied to bellows 168 as a measure of desired torque while the pressure ($p_5$) acting on bellows 178 is a corresponding measure of actual torque derived as follows:

There is shown a torque meter 190, including: a sun gear 192 fixed to a forward section of propeller shaft 36, a torque ring 194 concentric with gear 192 and connected thereto by three symmetrically disposed planet gears 196 rotatable on stub shafts 198 fixed to torque ring 194. An outer ring gear 200 engages the gears 196 and is fixed to a rearward section of shaft 36, the forward and rearward sections of shaft 36 being substantially the equivalent obtainable by cutting thru a single shaft at right angles to the shaft center-line. The force required to hold the torque ring 194 stationary is a measure of shaft torque and is transmitted, by means of a spring 209, thru a lever 202 attached to torque ring 194 to a piston 204 in a pressure control mechanism 206. Mechanism 206 controls the pressure ($p_5$) inside bellows 178 by regulating the flow of oil from conduit 78, thru a conduit 220 into pressure control mechanism 206, past a valve 218 attached to the other end of piston 204, from mechanism 206 thru a conduit 224 and thence thru a restriction 226 to drain conduit 84; elements 78, 220, 206, 224, 226 and 84 being connected in series in the order stated.

A body 208 included in the pressure control mechanism 206 has a cylindrical bore 210 opening at one end of body 208 for admission of piston 204 which is slidable in the bore. The other end of body 208 is closed; and, between the closed end of body 208 and piston 204 there is a wall 212 which forms chambers 214 and 216, respectively, on the upstream and downstream sides of valve 218. Valve 218 varies the area of opening between itself and a valve seat 219 in wall 212, in response to movement of the piston. Chamber 214 is connected to conduit 220 and chamber 216 is connected to the interior of bellows 178 by a conduit 222, and also to conduit 224. In operation, the piston 204 is subject to the force of spring 209 and an opposite force resulting from the pressure $(p_5)$ in chamber 216 which tends to move valve 218 toward its seat. When the force due to spring 209 exceeds the force due to the pressure in chamber 216, the piston moves toward the right to increase the opening of valve 218 and hence to increase the pressure in chamber 216 until the force of spring 209 is balanced.

The position of piston 204 at different conditions of equilibrium varies slightly depending on the design of valve 218, and the corresponding variation in movement of lever 202 depends on the rate of spring 209. The pressure in chamber 216 and hence the pressure $(p_5)$ in bellows 178 is thus maintained proportional to actual torque according to a substantially constant ratio of the pressure $(p_5)$ to the torque measured by torque meter 190. The restriction 226 provides continuous flow past valve 218, thereby rendering it possible for the pressure in chamber 216 to decrease when the torque, and hence the force of spring 209, decreases and piston 204 moves to the left to close valve 218.

Valve 180 in pitch control pressure regulator 174 is thus subject to forces due to the pressures $(p_4)$ and $(p_5)$, respectively, which are correponding measures of desired and actual torque. Regulator 174 functions to make the value of $(p_5)$ equal the value of $(p_4)$ so that a condition in which the actual torque is the desired torque may be realized.

A groove 228 is provided in valve 180 approximately opposite the center of length of guide 182 in constriction 184 of body 172, when the valve is in its neutral or equilibrium position. The lower end of conduit 78 is connected to a port 230 in guide 182 below groove 228, port 230 being just closed by the valve when valve 180 is in its neutral position. Similarly, one end of a conduit 232, having its other end connected to drain conduit 84, is connected to a port 234 in guide 182 above groove 228, port 234 also being just closed by the valve when valve 180 is in its neutral position. Conduit 48 has its lower end connected to constriction 184 of body 172, at the approximate center of the groove 228, when valve 180 is in neutral position; and serves to connect the propeller pitch control 44 to the annular chamber between guide 182 and the grooved portion of valve 180. The pressure $(p_6)$, hereinafter referred to as the pitch control pressure, is thus transmitted thru conduit 48 from the pitch control pressure regulator 174 to the propeller pitch control 44, which serves to increase the propeller pitch and hence the torque as the pressure $(p_6)$ increases, assuming that the speed remains constant.

When the value of $(p_5)$ is less than that of $(p_4)$ or when actual torque is less than desired torque, valve 180 is moved downward, thereby permitting the relatively high pressure of oil in conduit 78 to be transmitted past valve 180 thru conduit 48, increasing the pitch control pressure $(p_6)$ which in turn increases the actual torque. As the value of actual torque continues to increase, increase of pressure $(p_6)$ is stopped when the valve 180 is restored to neutral position, or when the actual torque equals desired torque and $(p_5)=(p_4)$. Should the value of $(p_5)$ be greater than that of $(p_4)$, as when the actual torque exceeds desired torque, valve 180 is moved upward, thereby permitting a reversal of the above process by causing flow from conduit 48, past valve 180, and thru conduit 232 to drain conduit 84, thereby decreasing the pitch control pressure $(p_6)$ which in turn decreases the actual torque. As the value of the actual torque continues to decrease, the decrease of pressure $(p_6)$ is stopped when the valve 180 is restored to neutral position, or when the actual torque again equals the desired torque and $(p_5)=(p_4)$.

The amount of flow occurring past valve 180, from conduit 78 or to conduit 232 is to some extent dependent on the peculiarities of construction of the propeller pitch control mechanism and the amount of leak at valve 180 which may be made negligible or deliberately established at a value known to produce best performance.

The pitch control pressure conduit 48 is connected across valve 180 to a conduit 236 which enters a body 238 of a governor mechanism indicated as 240. As subsequently explained, the governor mechanism serves to modify the torque control pressure $(p_6)$ and/or the motor pressure $(p_7)$ when the engine speed deviates from a predetermined desired value. The modified pressures produce increased torque and/or lower fuel flow when the engine speed exceeds the predetermined value; and, conversely, they produce decreased torque and/or increased fuel flow when the engine speed falls below the predetermined value.

Governor mechanism 240 comprises a speed responsive device indicated as 242 mounted in body 238 and driven by a gear 246 at a speed proportional to the engine speed. In body 238, there is a valve guide 248 and a valve 250 operable therein in response to device 242 which is connected to valve 250 at a groove 243 at the lower end of the valve. A spring 252 is in compression between a support 254 and the upper end of valve 250, which extends beyond the upper end of body 238. As the engine speed increases, the speed-responsive device 242 tends to move valve 250 upward relative to guide 248, in opposition to spring 252, and valve 250 is in equilibrium and stationary when the opposed forces due to spring 252 and to the speed responsive device 242 are equal. The position of spring support 254 is variable by means of a cam 255 which is operable on a shaft 256 in response to movement of a manually controlled lever 286. The particular value of engine speed, at which valve 250 is in its neutral or equilibrium position, is determined by the load on spring 252 and hence by the position of lever 286.

Valve 250 is provided with a pair of undercut portions of its length, 260 and 262, and guide 248 is provided with ports 264, 266, 268, 270 and 272 in body 238, the respective effective areas of flow thru ports 264, 268 and 272 being controlled by movement of valve 248. In its position of equilibrium, the valve just closes ports 264 and 268 and port 272 is slightly below the lower valving end of undercut 262 so that a slight speed decrease is required to open it. Ports 266 and 270 remain open thruout the range of operation of valve 250. Port 264 is connected by a conduit 274 to main oil supply conduit 78. Port 268 is connected to conduit 236; and port 272 is connected to a conduit 276 which in turn is connected to conduit 236. Port 270 is connected by means of a conduit 278 to drain conduit 84 and port 268 is connected to an hydraulic motor 280 by means of a conduit 282. Shaft 256 is connected to an engine control shaft 284 on which is mounted the engine control lever 286 which is rotatable thru an arc approximating 90° relative to a fixed quadrant 288. A link 290 connects lever 114 to a lever 258 fixed to shaft 256 so that the movement of cams 110 and 255, and hence the respective loads on springs 106 and 252, are subject to simultaneous regulation by the control lever 286.

During a first predetermined range of lever movement, from zero position to approximately 20 degrees, in the embodiment shown, the lift of cam 110 remains at a constant minimum value. The pressure ($p_3$) therefore has a constant minimum value, and the pressure ($p_4$) measuring desired torque varies as a minimum-valued function of the air pressure differential ($p_B - p_E$). Simultaneously, as the control lever is advanced thruout the first range, the lift of cam 255 increases so that the predetermined speed at which valve 250 is in neutral or equilibrium position increases from minimum value to an intermediate value which, in the embodiment shown, approximates 10,000 R. P. M. Thus in the first range of control lever movement, engine torque is of substantially constant minimum value and engine speed increases from minimum value to approximately 10,000 R. P. M. as the lever is advanced.

During a second predetermined range of movement of control lever 286, or approximately from twenty degrees to thirty degrees as indicated by quadrant 288, the lift of cam 110 increases slightly, with consequent increase in the value of pressure ($p_3$), and the pressure ($p_4$) measuring desired torque and hence the actual torque increase slightly thruout the range of values of a differential ($p_B - p_E$). Simultaneously, the the control lever is advanced thruout the second range, the lift of cam 255 continues to increase so that the predetermined speed at which valve 250 is in neutral or equilibrium position increases from an intermediate value, or from approximately 10,000 R. P. M. in the control of Figure 1, to the maximum or limiting speed which approximates 13,000 R. P. M. in the particular engine of Figure 1. Thus, in the second range of lever movement, as the control lever 286 is advanced, the torque increases slightly at all values of the differential ($p_B - p_E$) and the engine speed is increased to a limiting or maximum allowable value. As control lever 286 is further advanced thruout the third or final predetermined range of movement, approximately from 30° to 90° in the case shown, the lift of cam 110 increases to a maximum value and hence the engine torque increases from a value slightly greater than minimum to a maximum value. Simultaneously, the lift of cam 255 remains constant so that the predetermined engine speed remains a constant maximum value, regardless of torque changes.

The hydraulic motor 280 comprises a body 231 having a generally cylindrical bore 291 in which there is a piston 292, a rod 294, and a lever 296 for operating the delivery varying means associated with pump 56. Piston 292, rod 294, and lever 296 are so connected that upward movement of piston 292 causes clockwise movement of lever 296 and increases the pump delivery. The piston 292 is subject to a motor pressure differential between the motor pressure ($p_7$) in a chamber 298 at the lower end of bore 291 which is connected to conduit 282, and the pressure ($p_1$) in a chamber 300 at the upper end of bore 291, chamber 300 being connected to oil supply conduit 62. A spring 302 biases the piston in opposition to the motor pressure ($p_7$). Since the pressure ($p_1$) and the rate of spring 302 are substantially constant, it follows that the pump delivery varies as a function of the motor pressure ($p_7$), increasing as the control pressure increases.

The pitch control pressure regulator 174 is rendered subject to override by the governor mechanism 240 which simultaneously controls the motor pressure ($p_7$) and hence the fuel flow to the engine. Assuming that valve 180 in regulator 174 is in its neutral position, and that valve 250 in governor mechanism 240 is likewise in its neutral position, desired speed and torque values predetermined by the position of lever 286 will exist until the equilibrium of either or both valves is disturbed by one or more of several factors affecting engine operation. While a condition of desired speed and torque exist, it follows that the fuel flow is necessarily correctly controlled by proper regulation of the motor pressure ($p_7$) which is a function of the governor valve mechanism 240.

In starting the engine, it is necessary to accelerate the rotor by external means to a critical relatively low value of speed at which auto-ignition and self-operation take place. This speed approximates 8,000 R. P. M. in some engines of the type shown and is referred to as the minimum operating speed, minimum engine speed, or minimum speed.

*Operating condition (A)*

TORQUE CORRECT; ENGINE SPEED LOW

Considering the first range of movement of control lever 286 in which only the engine speed is varied while the torque is desired to remain at substantially constant minimum value, it is assumed in a condition (A) that the lever is advanced to a position corresponding to a speed between 8,000 and 10,000 R. P. M., and that, while the torque is correct, the speed of the engine is below the desired value. In this condition, valve 180 is in its neutral position. Valve 250, however, is below its neutral position and therefore it provides a continuous oil passage from conduit 236 across mechanism 240 to conduit 282.

It is provided that the pitch control pressure ($p_6$) at the minimum value of torque is relatively greater than the value of pressure ($p_7$) required at the motor 280, so that pressure ($p_6$) is used as a source of relatively high pressure for regulation of pressure ($p_7$). Thus as the continuous passage above referred to is opened in condition (A), pressure ($p_7$) increases, the fuel delivery increases, and the engine speed is increased.

Simultaneously, the pitch control pressure in conduit 48 decreases; and, in consequence, the propeller pitch decreases, the torque decreases owing to the change of pitch, the force supplied by torque meter 190 decreases and there follows a decrease in the value of pressure ($p_5$) in bellows 178. This series of reactions results in disturbance of regulator 174 from its condition of equilibrium, and valve 180 is caused to move downward, thereby permitting oil at the relatively high pressure ($p_2$) in conduit 78 to flow thru port 230 into undercut 228 and then into conduit 48. The pitch control pressure ($p_6$) is thus restored to its desired value, so that the actual engine torque remains substantially constant at the desired minimum value and the engine speed is increased to the desired value predetermined by the position of lever 286, the speed correction being due to increased fuel flow.

In the preceding paragraphs, the condition produced by flow of oil at pressure ($p_6$) to conduit 282, at pressure ($p_7$), is treated independently of a number of concurrent reactions. For example, as the torque decreases owing to the temporary change of propeller pitch which follows temporary decrease of pressure ($p_6$), the engine load decreases and hence the speed increases. This, however, manifests a temporary condition in which the torque and not the speed is below the desired value, the reverse of circumstances originally true in condition (A). This and corresponding concurrent reactions are of minor consequence, however, and the principal response of the apparatus to condition (A) is relatively unimpeded by such concurrent reactions.

In the event that, in condition (A), the engine speed falls so far below the desired value that valve 250 moves still farther downward to uncover port 272, oil may flow from conduit 236, not only to conduit 282 as previously explained, but also thru conduit 276 and port 272, past undercut 262, and thru port 270 and conduit 278 to drain conduit 84. The pitch control pressure ($p_6$) in conduit 48 and hence the engine torque are thus correspondingly further reduced. In this case, the engine is temporarily deliberately unloaded by governor mechanism 240 in order to increase the engine speed.

With both port 272 and port 268 now uncovered, it is apparent that the motor pressure ($p_7$) in conduit 282 does not increase as rapidly as a result of flow from conduit 236 to conduit 282, as is the case when port 268 is open and port 272 is closed, as explained in earlier reference to condition (A). Therefore, as the engine is deliberately unloaded to increase its speed, there is a temporary condition during which the motor pressure ($p_7$) and hence the fuel flow are slightly less than would be the case if valve 250 moved downward without uncovering port 272. The engine speed increases with extreme rapidity, however, when port 272 is uncovered, quickly approaching the predetermined desired value, and valve 250 is correspondingly quickly raised to a position at which port 272 is again closed. The relatively greater reduction of the pitch control pressure ($p_6$) in conduit 48 which follows opening of port 272 and consequent decreased torque produce a still lower value of the pressure ($p_5$) in regulator 174 than was true in the case previously explained when the engine speed was not sufficiently low to cause opening of port 272. Valve 180 in regulator 174 therefore more quickly responds to uncover port 230 and allows oil at the relatively high pressure ($p_2$) to flow from conduit 78, thru a greater effective area of opening thru port 230, past undercut 238 and into conduits 236 and 48, thereby restoring the desired values of pressures ($p_7$) and ($p_6$), whereby both the fuel flow and the torque are restored to desired values.

*Operating condition (B)*

TORQUE CORRECT; ENGINE SPEED HIGH

Again considering the first range of movement of control lever 286 in which only the engine speed is varied while the torque remains at substantially constant minimum value, and assuming a condition (B) in which the engine tends to overspeed when the lever 286 is moved to a position corresponding to a speed between 8,000 and 10,000 R. P. M. As indicated by the calibrated quadrant 289, valve 250 is above the neutral position shown in Figure 1.

In this condition, a continuous oil passage is provided from conduit 282 to drain conduit 278 and the motor pressure in conduit 282 and chamber 298 is consequently reduced. The fuel pump delivery is therefore reduced and the engine speed is hence decreased. Simultaneously, however, a second continuous oil passage is provided from conduit 274 to conduits 236 and 48, and the pitch control pressure ($p_6$) is increased and hence the torque increases and tends to decelerate the engine. The effect on torque just described is a temporary one. While both a decrease in fuel flow and an increase in torque are shown to be simultaneously co-operative in arresting the over-speeding of condition (B), nevertheless when the predetermined speed is finally obtained, the torque is restored to minimum value and the fuel flow is reduced to correspond to the reduction of speed from the over-speeding of condition (B) to the desired condition at which the actual speed has a value agreeing with that indicated by position of control lever 286. The temporary increase in torque occurring during this process is minimized by action of the device 174 which moves valve 180 upward to drain oil from conduit 48 to conduit 232 when the torque exceeds the desired value.

*Operating conditions (C)–(J), incl.*

Considering the third range of movement of control lever 286 in which the desired engine speed has a maximum or limiting value while the torque is varied from a value slightly greater than the minimum to a maximum value corresponding to the maximum brake-horsepower of the engine, at any point in this range in which the desired conditions apply the valves 250 and 180 are in their respective neutral or equilibrium conditions. One or more of several factors can disturb the condition of equilibrium of either valve, however, and both may be disturbed at the same time so that a range of conditions may result in which the torque is either as desired or higher or lower than desired; while the speed is respectively as desired or lower or higher than desired. The following conditions (C) to (J), inclusive, involve deviations from desired torque and speed settings.

*Operating condition (C)*

TORQUE HIGH; ENGINE SPEED CORRECT

In condition (C), the engine speed has a limiting value as desired and the engine torque is higher than desired, valve 250 therefore being in neutral position while valve 180 is above its neutral position. A passage is thus provided for flow from conduit 48 to conduit 234 and thence to drain conduit 84, whereby the pitch control pressure ($p_6$) and hence the torque is decreased. Such torque decrease produces an increased speed which is compensated by valve 250 which rises from its neutral position as the speed increases and allows flow to occur from conduit 282 to conduit 278 and thence to drain conduit 84, thereby decreasing the motor pressure ($p_7$) and the fuel flow. The torque is thus restored to the desired value and the resulting increase in the value of speed is corrected by the reduction of fuel flow as explained, so that both torque and speed are ultimately restored to their respective desired values. In this and other similar conditions, assuming perfect operation of the apparatus, both torque and speed control changes occur simultaneously; the amount of change of either approaching an infinitesimal value when the desired condition of speed and torque is approached, provided the sensitivity of response of and to the control is satisfactory and that no new torque or speed develops during the process described.

*Operating condition (D)*

TORQUE LOW; ENGINE SPEED CORRECT

Condition (D) differs from condition (C) in that the torque is initially below rather than above the desired value, the engine speed being maximum as desired. In this case, valve 250 is initially in neutral position while valve 180 is below its neutral position and provides an oil passage from conduit 78 to conduit 48, thereby increasing the pitch control pressure ($p_6$) and the torque. The torque increase is attended with a speed reduction and consequent lowering of valve 250 to a position at which there is a passage for oil from conduit 236 to conduit 282 and a resulting fuel flow increase and hence a speed increase, as previously explained. The process of gradual torque increase and speed compensation continues until the torque is restored to the higher value desired and the speed is maintained at the desired limiting value.

*Operating condition (E)*

TORQUE CORRECT; ENGINE SPEED HIGH

In condition (E), the engine overspeeds but the torque is as desired. The speed is reduced by operation of valve 250 to reduce the motor pressure ($p_7$), the valve moving upward to permit flow from conduit 282, thru port 268, past undercut 262, into port 248, and thru conduit 278 to drain conduit 84. Simultaneously, oil is permitted to flow from conduit 274, thru port 264, past undercut 260 and thru conduit 236 to the pitch control pressure regulator 174. The pitch control pressure ($p_6$) is thereby increased, the torque increases and there is a corresponding speed decrease supplementing the speed decrease produced by the fuel flow decrease referred to. In response to the torque change, torque meter 190 and mechanism 206 co-operate to increase the value of pressure ($p_5$). This causes valve 180 in regulator 174 to rise, thereby allowing oil to flow thru port 234 and conduit 232 to drain conduit 84, the pitch control pressure ($p_6$) being thereby restored to the desired value. Thus, in this process of correcting a condition of overspeeding the effect on torque is temporary.

*Operating condition (F)*

TORQUE HIGH; ENGINE SPEED HIGH

In condition (F), the engine overspeeds and the torque is higher than desired. Valve 250 in governor mechanism 240 operates to reduce the fuel flow and hence the speed, and valve 180 in mechanism 174 operates to decrease the pitch and hence the torque, each correction involving a process previously described. Concurrently, there is a tendency for the speed to increase as the torque is reduced by mechanism 174; similarly, there is a tendency for the torque to increase as the speed is reduced by mechanism 240. The latter speed and torque effects are temporary, however, the process of correction being continuous until both speed and torque have desired values.

*Operating condition (G)*

TORQUE LOW; ENGINE SPEED HIGH

In condition (G), the engine overspeeds and the torque is lower than desired. Again valve 250 operates to reduce the fuel flow and hence the speed. Simultaneously, valve 250 temporarily produces a torque increase and valve 180 operates to increase the torque and to thereby tend to further decrease the speed. The process continues until both speed and torque are restored to desired values. The relative extent of compensation by valves 180 and 250 depends upon the relative extent of variation of speed and torque from desired values.

*Operating condition (H)*

TORQUE HIGH; ENGINE SPEED LOW

In operating condition (H), the engine speed is lower than desired and the torque is higher than the predetermined value. Valve 180 is therefore above its neutral position and valve 250 is below its neutral position. Assuming that the speed is not sufficiently low to permit opening of port 272, then oil is being drained from conduit 48 to port 234 and thence thru conduit 232 to drain conduit 84. The resulting decreased torque tends to increase the speed. Simultaneously, valve 250 is below its neutral position and therefore permits flow from conduit 236 to conduit 282 and the fuel flow and engine speed are increased. The process continues until desired values of both speed and torque are restored.

If the speed falls far enough below the desired value to permit valve 250 to uncover port 272, the process followed in restoration of speed and torque values is a combination of the processes outlined in reference to conditions (A) and (H).

*Operating condition (I)*

TORQUE CORRECT; ENGINE SPEED LOW

In condition (I), the engine speed is low, while the torque has the desired predetermined value. In this condition, valve 180 is in its neutral position, while valve 250 is below its neutral position. The process of correction involves those previously explained.

*Operating condition (J)*

TORQUE LOW; ENGINE SPEED LOW

In condition (J) both torque and engine speed are below their respective desired predetermined values, and hence both valves 180 and 250 are below their respective neutral positions. Flow may occur, therefore, from conduit 78 thru port 230, past undercut 228, into conduits 48 and 236. From conduit 236 the flow continues thru port 266, past undercut 260, into conduit 282. Both the pitch control pressure ($p_6$) and the motor pressure ($p_7$) are thereby increased and the desired values of speed and torque are restored. The process may involve one or more of those previously explained in connection with conditions (A) to (I), depending on the absolute and relative extents to which speed and torque are initially below desired values.

In the intermediate range of movement of control lever 286, in which both the speed and the torque are increased as the lever is advanced, deviations from desired conditions are compensated in a manner similar to one or another combination of processes explained in connection with the conditions (A) to (J), inclusive.

It is thus shown that the fuel flow and hence the engine speed is controlled by the governor mechanism 240. It is also shown that there is a temporary slight variation in torque when valve 250 is temporarily disturbed from its neutral position due to deviation of the engine speed from a predetermined value.

It is also shown that the engine torque is a function of the response of the pressure ($p_6$) in conduit 48 to movement of the control lever 286, the lever position determining the value of the pressure ($p_3$) in pressure regulator 72, and the control valve mechanism 118 determining the value of pressure ($p_4$) corresponding to any given value of the pressure differential ($p_B-p_E$). It is further shown that when the engine temperature exceeds a predetermined value, the value of the differential ($p_B-p_E$) decreases from the value of the compressor pressure differential until the limiting temperature or a desired function of the limiting temperature is restored.

The control valve mechanism 118 has two additional functions, namely; it determines the rate of change of engine torque and hence the engine speed, as the control lever is advanced or retarded, thus being an acceleration and deceleration control of both torque and speed; and, it serves as an altitude control since, as previously explained, the compressor pressure differential decreases as altitude increasse or as the air density decreases.

FIGURE 2

Referring to the drawing, Figure 2, there is shown diagrammatically the internal combustion engine of Figure 1 and connected thereto: a tube 50 for supplying air to the control apparatus at the static pressure ($p_E$) in the air entrance 12; a tube 52 for supplying air to the control apparatus at the static pressure ($p_D$) downstream from compressor 14; and a conduit 54 for fuel flowing to the manifold 22 in the engine from a variable delivery fuel pump indicated as 56, which is driven by the engine thru gearing 58 and is connected to a source of fuel by a fuel inlet conduit 60.

There is shown an oil supply conduit 62 for the flow of engine lubricating oil, at a pressure ($p_1$), to an inlet conduit 64 and thence to a pump 66 having a constant delivery at any given speed. From pump 66 oil flows at a superatmospheric pressure ($p_2$) thru a conduit 304. Conduit 304 is connected by a conduit 306 to a by-pass valve mechanism 308 comprising a body 310, a chamber 312, an aperture 314 connecting chamber 312 to conduit 306, and a drain channel 316 connecting chamber 312 to a drain conduit 318 which in turn is connected to conduit 62. A valve 320 has one end slidable in a guide 322 in body 310 opposite aperture 314, and has its other end in aperture 314 and effective to vary the area of flow therethru from conduit 306 to drain channel 316 as a function of the value of the differential between the pressure ($p_2$) in conduit 306 and the pressure ($p_1$) in chamber 312. A spring 324 is in compression between valve 320 and the upper end of chamber 312 and tends to force valve 320 toward a seated position in aperture 314 in opposition to the pressure differential ($p_2-p_1$). Since the value of pressure ($p_1$) may be assumed to be substantially constant and since the rate of spring 324 and the load thereon is substantially constant, it follows that the by-pass valve mechanism 308 maintains the pressure ($p_2$) in conduit 304, and hence in conduit 304, at a substantially constant predetermined value.

Conduit 304 is connected thru a restriction 326 to a first pressure regulator generally indicated as 328 which includes: a body 330 and a diaphragm assembly 332, which together form a chamber 334, a diaphragm retainer 336, and a valve 338 attached to diaphragm assembly 332, which includes a diaphragm 340. Valve 338 operates in a seat 342 in body 330. Seat 342 is connected to conduit 62 by a conduit 344. A spring 346, in compression between diaphragm assembly 332 and a retainer 348, tends to move valve 338 toward seat 342 with a substantially constant force in opposition to a force produced by the differential between the pressure ($p_3$) in chamber 334 and the atmospheric pressure ($p$) acting on diaphragm assembly 332. The gage pressure ($p_3$) is therefore substantially constant when the position of support 348 is constant and hence when the load on spring 346 is substantially constant.

The particular value of pressure ($p_3$) in chamber 334 is controlled by the position of support 348 which is operable by a cam 350 mounted on a shaft 352 which is rotatable thru an arc of predetermined length by a manually controlled lever 354.

Similarly, conduit 304 is connected thru a restriction 356 to a second pressure regulator generally indicated as 358 which includes: a body 360 and a diaphragm assembly 362, which together form a chamber 364, a diaphragm 370, a diaphragm retainer 366, and a valve 368 attached to assembly 362. Valve 368 operates in a seat 372 in body 360. Seat 372 is connected to conduit 62 by conduits 374, 376 and 318. A spring 378, in compression between diaphragm assembly 362 and a retainer 360, tends to move valve 368 toward seat 372 with a substantially constant force in opposition to a force produced by the differential between the pressure ($p_8$) in chamber 364 and the atmospheric pressure ($p$) acting on the upper side of diaphragm assembly 362. The gage pressure ($p_8$) is therefore substantially constant when the position of support 380 is constant and hence when the load on spring 378 is substantially constant.

The particular value of pressure ($p_8$) in chamber 364 is controlled by the position of support 380 which is operable by a cam 382 mounted on a shaft 384 which is rotatable thru an arc of predetermined length in response to movement of a manually controlled lever 543.

Chamber 334 in first pressure regulator 328 is connected by a conduit 388 to a first control valve mechanism 390 including a housing 392 having two adjoining chambers 394 and 396 in its opposite ends. A bellows 398 is fixed to body 392 in the right-hand end of chamber 394 and is connected to a valve 400 which operates in a guide 402 at the right-hand end of chamber 396. The end of valve 400 is contoured and is operable in a seat 401 at the right-hand end of conduit 388 in response to movement of bellows 398, and in opposition to a spring 404, to increase the effective area of seat 401 and hence to increase the flow to chamber 396. Chamber 396 is connected to a conduit 406 and to another conduit 408 which is connected to conduit 62 and in which there is a restriction 410.

Conduit 406 is connected to an hydraulic motor generally indicated as 412 by a conduit 414. The motor pressure ($p_7$) in conduits 406 and 414 is a measure of the desired fuel flow to the engine and is regulated as a function of the value of pressure ($p_3$) in chamber 334, the contour of valve 400, and the position of valve 400 in relation to seat 401. Oil enters chamber 396 in control valve mechanism 390 thru conduit 388, passes valve 400 and flows from chamber 396 thru conduit 408 and restriction 410 to conduit 62. The motor pressure ($p_7$) increases as the pressure ($p_3$) increases or as the effective area of seat 401 increases and hence as bellows 398 collapses.

Similarly, chamber 364 in second pressure regulator 358 is connected by a conduit 416 to a second control valve mechanism 418 including a housing 420 having two adjoining chambers 422 and 424 in its opposite ends. A bellows 426 is fixed in body 420 in the right-hand end of chamber 422 and is connected to a valve 428 which operates in a guide 430 at the right-hand end of chamber 424. The end of valve 428 is contoured and is operable in a seat 429 at the right-hand end of conduit 416 in response to movement of bellows 426, and in opposition to a spring 432, to increase the effective area of seat 429 and hence to increase the flow to chamber 424. Chamber 424 is connected to a conduit 434 which is connected to another conduit 436.

One end of conduit 436 is connected to the interior of a bellows 438 in a pitch control pressure regulator indicated as 440. The other end of conduit 436 is connected thru a fixed restriction 442 to drain conduits 376 and 318. The pressure ($p_4$) in conduits 434 and 436 and in bellows 438 is a measure of the desired torque and is regulated as a function of the value of pressure ($p_8$) in chamber 364, the contour of valve 428, and the position of valve 428 in relation to seat 429. Oil enters chamber 424 in control valve mechanism 418 thru conduit 416, passes valve 428, and flows from chamber 424 thru conduits 434 and 436, then thru restriction 442, whence the flow continues to drain conduits 376 and 318. The pressure ($p_4$), measuring the desired torque, increases as the pressure ($p_8$) increases or as the effective area of seat 429 increases and hence as bellows 426 collapses.

Control valve mechanism 390 and 418 are connected by a conduit 444 to equalize the pressures in chambers 394 and 422. Chamber 394 is connected by a conduit 446, thru a restriction 448, to the compressor discharge pressure tube 52 and the pressure ($p_B$), in conduits 446 and 444 and in chambers 394 and 422, tends to collapse bellows 398 and 426.

The interior of bellows 426 is connected to a conduit 450 and bellows 398 is connected to conduit 450 by another conduit 451. Conduit 450 is connected to the compressor entrance pressure tube 50, whence the respective interiors of bellows 398 and 426 are always subject to the pressure ($p_E$) which tends to extend the bellows.

A thermal control 452 is connected to conduit 50 and also by means of a conduit 454 to conduit 446 at a point in conduit 446 between restriction 448 and control valve mechanism 390. Thermal control 452 comprises a body 456 having a wall 458 separating an inlet chamber 460, which is connected to conduit 454, from an outlet chamber 462, which is connected to conduit 50. One end of a thin-walled tube 464 is fixed to the closed end of body 456 nearest chamber 462; and has attached to its other end, which is closed, a rod 466 which is slidable in a centrally located aperture 468 in the end of body 456 to which tube 464 is fixed. The free end of rod 466 is contoured to form a valve 470 which is operable in a seat 472 in wall 458. Tube 464 and rod 466 are made from materials having substantially different coefficients of thermal expansion and the unit is installed in the engine with tube 464 exposed to the temperature of combustion gases in the tailpipe, as shown diagrammatically in Figure 1, or other desired location. As the temperature increases, the tube 464 expands faster than rod 466, thereby increasing the effective area of opening between valve 470 and seat 472. Generally, control 452 is made so that the valve remains closed until a limiting value of temperature is exceeded.

When valve 470 is closed, as is normally true, the pressure in chambers 394 and 422 outside bellows 398 and 426 is the same as the pressure in conduit 446 and tube 52, there being no flow thru restriction 448; hence the pressure ($p_B$) = the pressure ($p_D$), when valve 470 is closed. Since the pressures inside bellows 398 and 426 is always the pressure ($p_E$) in the tube 50, then in normal operation below the limiting temperature, bellows 398 and 426 are subject to the pressure differential ($p_D - p_E$).

When valve 470 is open, however, as is the case when the value of limiting temperature is exceeded, flow occurs thru tube 52, restriction 448, a portion of conduit 446, and conduit 454, thru inlet chamber 460, past valve 470 into chamber 462 and to the engine thru conduit 50. The pressure in conduits 454 and hence the pressure in conduit 446 is then less than that in tube 52, because of the pressure drop across restriction 448, the pressure decrease being a function of the respective areas of restriction 448 and of the opening past valve 470. When the valve is open, therefore, the pressure ($p_B$) is less than the pressure ($p_D$) and bellows 398 and 426 are subject to the pressure differential ($p_B - p_E$), which, in this case, is less than the differential ($p_D - p_E$).

Valve 400 in control mechanism 390 is subject to a closing force due to spring 404 and an opposite force due to the differential ($p_B - p_E$). Since the performance characteristics of spring 404 are constant, it follows that for every value of the pressure differential ($p_B - p_E$) there is a predetermined position of valve 400 in seat 401, and hence a predetermined area of flow past the valve, depending on its contour. For a given contour, when the temperature does not exceed the predetermined limiting value at which thermal control valve 470 opens, it follows that the motor pressure ($p_7$) in conduits 406 and 414 varies as a function of the pressure ($p_3$) and the pressure differential ($p_D - p_E$).

Similarly, valve 428 in control mechanism 418 is subject to a closing force due to spring 432 and an opposite force due to the differential ($p_B - p_E$). Since the performance characteristics of spring 432 are constant, it follows that for every value of the pressure differential ($p_B - p_E$) there is a corresponding position of valve 428 in seat 429, and hence a corresponding area of flow past the valve, depending on its contour. For any given contour, when the temperature does not exceed the predetermined limiting value at which the thermal control valve 428 opens, it follows that, in conduits 434 and 436, the pressure ($p_4$) measuring desired torque varies as a function of the pressure ($p_3$) and the pressure differential ($p_D - p_E$).

The motor pressure ($p_7$) in conduit 414 is used to control the fuel flow in the following manner. The hydraulic motor 412 comprises a body 474 having a generally cylindrical bore 476 in which there is a piston 478, a rod 480, and a lever 482 for operating the delivery varying means associated with pump 56. Piston 478, rod 480, and lever 482 are so connected that movement of the piston toward the right causes counterclockwise movement of lever 482 and increases the pump delivery. The piston 478 is subject to a motor pressure differential between the motor pressure ($p_7$) in a chamber 484 at the left-hand end of bore 476 which is connected to conduit 414, and the pressure ($p_1$) in a chamber 486 at the right-hand end of bore 476, chamber 486 being connected to one end of conduit 62. A spring 488 biases the piston in opposition to the motor pressure ($p_7$). Since the pressure ($p_1$) and the rate of spring 488 are substantially constant, it follows that the pump delivery varies as a function of the motor pressure ($p_7$), increasing as the motor pressure increases.

A measure of the actual torque is obtained by use of a torque meter, shown diagrammatically as 490, which is similar in all respects to the torque meter 190 of Figure 1. The torque meter is connected to the engine shaft and a force measuring the actual shaft torque is transmitted thru a lever 493 by a spring 492 to one end of a piston 494 in a pressure control mechanism 496. The mechanism 496 comprises a body 498 having a cylindrical bore 500 opening at one end of body 498 for admission of piston 494 which is slidable in the bore. The other end of body 498 is closed; and, between the closed end of body 498 and piston 494, there is a wall 502 which forms chambers 504 and 506, respectively, on the upstream and downstream sides of a valve 508 which is attached to piston 494, and which varies the effective area of flow thru a valve seat 510 in wall 502, in response to movement of the piston. Chamber 504 is connected to conduit 304 and is therefore subjected to the relatively high pressure ($p_2$).

Chamber 506 is connected to the interior of a bellows 512 in the pitch control pressure regulator 440 by a conduit 514; and also by a conduit 516 which is connected thru a restriction 518 to drain conduit 318. Bellows 512 and 438 are identical in the embodiment of Figure 2 but may be of different sizes, if necessary, to satisfy particular design or functional requirements. In operation, the piston 494 is subject to the force of spring 492 and an opposite force resulting from the pressure in chamber 506 which tends to move valve 508 toward its seat. When the force due to spring 492 exceeds the force due to the pressure in chamber 506, the piston moves upward to increase the opening of valve 508 and hence to increase the flow of oil from conduit 304, to chamber 504, past valve 508, into chamber 506 and therefrom thru conduit 516 and restriction 518.

The position of piston 494 at different conditions of equilibrium varies slightly depending on the design of valve 508, and the corresponding variation in movement of lever 493 depends on the rate of spring 492. The pressure in chamber 506 and hence the pressure ($p_5$) in bellows 512 is proportional to actual torque according to a substantially constant ratio of the pressure ($p_5$) to the torque measured by torque meter 490.

The restriction 518 provides continuous flow past valve 508, thereby rendering it possible for the pressure in chamber 506 to decrease when the torque, and hence the force of spring 492, decreases and piston 494 moves downward to close valve 508.

The pitch control pressure regulator 440 includes a body 520 and a chamber 534 to opposite sides of which bellows 512 and 438 are fixed. The unsupported ends of bellows 512 and 438 are connected to each other by a rod 522 with which one end of a lever 524 has a pin and slot connection, the other end of lever 524 being hinged at a bearing 526 which is fixed in body 520. At a point between its ends, lever 524 is connected to the end of a valve 528 which is operable in a seat 530 in response to movement of lever 524 and effective to vary the area of flow past valve 528. Chamber 534 is connected to drain conduits 376 and 318 by a conduit 536, and is therefore subject to the pressure ($p_1$). Seat 530 separates chamber 534 from another chamber 532.

Valve 528 is thus subject to a force proportional to the differential between forces due to the pressures ($p_5$) and ($p_4$), respectively, acting in bellows 512 and 438, which pressures are respective measures of the actual torque and the desired torque. A condition of equilibrium applies when the pressure ($p_4$) equals the pressure ($p_5$). Chamber 532 is connected by a conduit 542 to a conduit 544 which in turn is connected to a propeller pitch control shown diagrammatically as 546. Pitch control 546 is responsive to the pitch control pressure ($p_6$) in chamber 532, increasing the pitch and hence the torque as pressure ($p_6$) increases. In the condition of equilibrium referred to, in which the actual torque equals the desired torque or in which pressures ($p_5$) and ($p_4$) are equal, it follows that the pressure ($p_6$) has a value corresponding to a desired value of propeller pitch and torque.

In the apparatus of Figure 2, the motor pressure ($p_7$) is always greater than the corresponding pitch control pressure ($p_6$) in conduit 544. Accomplishment of this is largely a function of the relative sizes of the piston 478 in motor 412, and the corresponding pressure responsive means in propeller pitch control 546; the motor pressure increasing in respect to the pitch control pressure as the area of piston 478 decreases in respect to that of the corresponding pressure responsive means in the propeller pitch control. Fluid is supplied to chamber 532 in pitch control pressure regulator 440, from conduit 406, thru conduits 542 and 544 and governor mechanism 556.

When the pitch control pressure regulator 440 is not in equilibrium, as when the actual torque and hence pressure ($p_5$) is greater than the desired torque and hence pressure ($p_4$), the pressure ($p_6$) is obviously greater than desired. When this occurs, however, the force produced by pressure ($p_5$) in bellows 512 is greater than the force produced by pressure ($p_4$) in bellows 438 and lever 524 moves valve 528 to the right, increasing the opening past the valve and reducing the value of pressure ($p_6$). This continues until the pitch and hence the torque decrease so that the value of the pressure ($p_5$) is restored to the value of pressure ($p_4$).

Similarly, when the actual torque and hence pressure ($p_5$) is less than the desired torque and hence pressure ($p_4$), the pressure ($p_6$) is less than desired. In this case, the unbalance of pressures acting in bellows 512 and 438 causes lever 524 to move to the left, thereby moving valve 528 in a closing direction and increasing the pressure ($p_6$) in chamber 532. The torque therefore increases until a condition of equilibrium is again restored.

The governor mechanism 556 comprises a speed responsive device indicated as 558 mounted in a body 560 and driven by a gear 562 at a speed proportional to the engine speed. In body 560, there is a valve guide 564 and a valve 566 operable therein in response to device 558, which is connected to valve 566 at a groove 568 at the lower end of the valve. A spring 570 is in compression between a support 572 and another support 574 fixed to the upper end of valve 566, valve 566 extending above body 560. As the engine speed increases, the speed responsive device 558 tends to move valve 566 upward relative to guide 564, in opposition to spring 570, and valve 566 is in equilibrium and stationary when the opposed forces due to spring 570 and to device 558 are equal. The position of spring support 572 is variable by means of a cam 574 which is operable on a shaft 576 connected to shaft 550 and hence responsive to movement of control lever 548. The particular value of engine speed, at which valve 566 is in its equilibrium position, is determined by the load on spring 570 and hence by the position of lever 548.

Valve 566 is provided with an undercut 578 and guide 564 is provided with a port 580 connected to conduit 406 and a port 582 connected to conduit 544 which is connected to the propeller pitch control 546. In its equilibrium position, valve 566 is moved upward so that the upper end of undercut 578 is slightly above the lower edge of port 580 so that there is a path for flow from conduit 406 at pressure ($p_7$) thru port 580, a recess 584 formed by undercut 578 and port 582 to conduit 544. The port 582 is open to recess 584 thruout the range of operation of valve 566. When the predetermined value of speed is exceeded, valve 566 is disturbed from its equilibrium position and rises to increase the effective area of flow thru port 580, and hence to increase the flow to conduit 544.

When flow into conduit 544 is increased as a result of overspeeding and consequent increased effective opening past valve 566, the pitch control pressure ($p_6$) in conduit 544 is temporarily increased so that the propeller pitch is increased to provide temporarily increased torque. Corresponding to the increased flow to conduit 544, there is a reduction of the value of pressure ($p_7$) in conduit 414. Thus, when the predetermined value of speed is exceeded, the desired speed is restored by simultaneous fuel flow decrease and torque increase.

The torque increase referred to in the immediately preceding paragraph is detected by the torque meter 490 which immediately responds by opening valve 508 and increasing the value of pressure ($p_5$) in bellows 512 in pitch control pressure regulator 440. Since the value of desired torque has not been altered, the increase of pressure ($p_5$) disturbs the equilibrium of valve 528 which is moved toward the right to permit greater flow past the valve and consequent reduction of the pitch control pressure ($p_6$). The pressure ($p_6$) is thus restored to a value corresponding to the desired value of torque and regulator 440 is restored to equilibrium. In overspeeding, therefore, the effect of torque increase is temporary, the speed being finally established at the desired value by regulation of the pressure ($p_7$) in conduits 406 and 414.

Corresponding to the condition of overspeeding explained above, the reaction of the apparatus to a condition of speed decrease below the desired value is as follows: Valve 566 moves downward and, depending upon the amount of speed decrease, decreases the effective area of flow from conduit 406 to conduit 544. The motor pressure ($p_7$) in conduit 406 is thereby increased so that the fuel flow is increased. Also, the pitch control pressure ($p_6$) is decreased, the propeller pitch decreases, the torque decreases, and the engine speed increases, therefore, both because of the fuel flow increase and the torque decrease. Since the change of torque disturbs equilibrium of regulator 440 and valve 528, the torque is subsequently corrected to the desired value, the fuel flow being the final means of restoring the engine speed to the desired value.

Engine control lever 548 is fixed to a shaft 550 and which is rotatable thru an arc of predetermined length in respect to a calibrated fixed quadrant 552. Shaft 550 is connected to shaft 384 and a link 554 connects lever 354 to a lever 386 mounted on shaft 384 so that movement of control lever 548 operates both cams 350 and 382 and hence there are predetermined values of the pressures ($p_3$) and ($p_8$) for each position of lever 548. The fuel flow to the engine and the engine torque are therefore responsive to movement of the control lever 548, but a governor mechanism 556 is provided to override normal control when the engine speed exceeds predetermined limiting or desired values.

During a first predetermined range of movement of control lever 548, from zero position to approximately 20 degrees in the embodiment shown, the lift of cam 575 increases corresponding to an increase in the predetermined limiting value of speed from a minimum value to an intermediate greater value which approximates 10,000 R. P. M. in the particular engine shown. Simultaneously, the lift of cam 350 increases, so that in steady-state operation at any point in the first range of lever movement, the fuel flow is such that the engine temperature is a preselected amount less than the limiting value. The lift of cam 382 is substantially constant thruout the first range of lever movement, and provides for a minimum value of pressure ($p_4$) and hence minimum torque. Thus, in the first range, torque has a constant minimum value and the engine speed is increased to an intermediate value somewhat less than the limiting value.

During the second predetermined range of movement of control lever 548, or approximately from 20-degree to 30-degree positions in the embodiment shown, the lift of cam 575 continues to increase corresponding to an increase in the predetermined limiting speed from the intermediate value previously referred to as approximately 10,000 R. P. M. to the maximum limiting value which approximates 13,000 R. P. M. in some engines of the type shown in Figure 1. Simultaneously, the lift of cam 350 continues to increase, so that the fuel flow to the engine continues to increase as the lever is advanced, the fuel flow always being a preselected amount less than that required to produce limiting temperature, in steady-state operation. The lift of cam 382, in the second range of lever movement, increases slightly as the lever is advanced; and the pressure ($p_4$), measuring the desired torque, and hence the actual torque increases from a minimum to a slightly greater than minimum value.

As control lever 548 is advanced thruout the third range of movement, the lift of cam 575 remains constant, corresponding to a speed which is the maximum allowable or desired limiting speed. The lift of cam 382 increases to a maximum, however, corresponding to an increase in torque to a maximum value. Since the torque is increased as the lever is advanced, it follows that the fuel flow increases as the lever is advanced, in order to increase the engine brake-horsepower, and thereby maintain the predetermined constant maximum speed. The engine temperature rises as the lever is advanced in this range, and in steady-state operation the temperature most nearly approaches the limiting value when the lever is farthest advanced and hence when speed, torque, and brake-horsepower have maximum values.

During acceleration, as occurs during the interval following advance of lever 548 in which the engine gradually assumes a new condition of steady-state operation, the response of control valve mechanisms 390 and 418 to increasing compressor pressure differential is controlled by means including the contour of valves 400 and 428 and the area of restriction 448, so that the engine operates at or near the limiting temperature until the particular setting speed value is closely approached.

A second function of the contour of valves 400 and 428 and of control mechanisms 390 and 418 is to compensate changes in altitude. Increased altitude is accompanied by decreased air density and decreasing values of the compressor pressure differential and thus affords automatic altitude compensation as a function of compressor characteristics. Use of contoured valves such as 400 and 428, however, render it possible to regulate density compensation somewhat independently of the compressor characteristics and to include in design of the respective contours of valves 400 and 428 satisfactory treatment of the problem of acceleration.

It has thus been shown that the fuel and torque control apparatus of Figure 2 regulates the speed and torque of the engine and the fuel flow thereto as functions of the compressor pressure differential and of manual control. It has also been shown that speed and temperature in excess of predetermined values are prevented by an override governor mechanism and a thermal control. The process by which the engine performance is maintained at the desired condition indicated by position of the manual control lever has been shown to be a co-operative function of the governor mechanism 556 and the pitch control pressure regulator 440. Predominant control of acceleration and altitude compensation are shown to be inherent functions of the control valve mechanisms 390 and 418.

While the use of single bellows responsive to an air pressure differential between the static compressor discharge pressure and the static compressor inlet pressure is specified in both Figures 1 and 2, alternate arrangements include equivalent use of single bellows or pairs of bellows responsive to the compressor rise, the absolute compressor discharge pressure, the compressor discharge gage pressure, the absolute compressor inlet impact pressure, the differential between the compressor discharge pressure and the compressor inlet impact pressure, or to the differential between static and impact pressure in the course of air flow.

While the embodiments of my invention shown and described herein specify use of collapsible bellows as pressure responsive means, the invention does not preclude employment of an equivalent arrangement of pressure responsive pistons, diaphragms, or other means. Similarly, the use of engine oil pressure specified herein does not preclude employment of any suitable hydraulic fluid properly applied.

Other terms and expressions which I have employed are used as terms of description and not of limitation, and I have no intention in the use of such terms and expressions of excluding any equivalents of the features shown and described or portions thereof, but recognize that various modifications are possible within the scope of the invention claimed.

I claim as my invention:

1. Fuel control apparatus for an internal combustion engine having a pump for delivering fuel thereto, said pump having means for varying the delivery thereof, comprising: hydraulic motor means responsive to a motor fluid which is separate from said fuel and whose pressure is responsive to an air pressure in said engine for actuating said delivery varying means; valve means responsive to the engine speed and adapted to vary the response of said motor to said fluid pressure so as to increase said pump delivery and hence restore said speed when said speed temporarily falls below a predetermined value, and to maintain said increased pump delivery after restoration of said speed to said value; said valve means being also adapted to vary the response of said motor to said fluid pressure so as to decrease said pump delivery and hence restore said speed when said speed temporarily exceeds said predetermined value, and to maintain said decreased pump delivery after restoration of said speed to said value; and manually operated means for varying the action of said valve means so that the engine speed has a substantially constant predetermined value which is a selected function of the operation of said manually operated means.

2. For an internal combustion engine having a compressor for delivering combustion air thereto, a shaft connecting said engine to a variable load means for varying said load and thereby varying the torque transmitted by said shaft; torque control apparatus comprising: first hydraulic means responsive to an air pressure in the engine and adapted to regulate a first pressure in said first means proportional to the desired value of said torque; second hydraulic means, responsive to said first pressure and to the actual engine torque, for regulating a second pressure in said second means, said load varying means being responsive to said second pressure and adapted to maintain the value of said actual torque equal to the value of said desired torque; governor valve means and a conduit for transmitting said second pressure thereto, said governor valve means being responsive to the engine speed and adapted to increase said second pressure and hence said actual torque when a predetermined value of engine speed is temporarily exceeded; and manually operated means for varying said predetermined value; whereby said shaft torque is a predetermined function of the operation of said first means, said manually operated means and the engine speed.

3. For an internal combustion engine having a pump for delivering fuel thereto, said pump having means for varying the delivery thereof, a shaft connecting said engine to a variable load, and means for varying said load and thereby varying the torque transmitted by said shaft, fuel and torque control apparatus comprising: first means, responsive to the net value of the desired and actual torques of said shaft, for regulating the operation of said load-varying means so as to maintain equality of the respective values of said actual and desired torques; and second means, responsive to the engine speed and coacting with said first means, for modifying the action of said first means to increase the value of said actual torque and simultaneously operating said delivery varying means to decrease said fuel flow, thereby decreasing said engine speed; whereby said shaft torque is a desired function of the operation of said first means, and whereby there is a preselected relationship between said torque and the fuel flow to the engine at a predetermined value of speed.

4. For an internal combustion engine having a pump for delivering fuel thereto, said pump having means for varying the delivery thereof, a shaft connecting said engine to a variable load, and means responsive to a control pressure for varying said load and thereby varying to the torque transmitted by said shaft as a direct function of said control pressure; fuel and torque control apparatus comprising: a source of hydraulic fluid, motor means for controlling said fuel delivery varying means in response to a variable pressure in said fluid; governor valve means responsive to the speed of said engine; and conduit means, connected to said governor valve means, including a first conduit connecting said governor valve means with said motor means, and a second conduit connecting said governor valve means with said load-varying means; said governor means being adapted to control the flow thru said conduit means so that, when said speed exceeds a predetermined value, said control pressure is varied in a torque-increasing sense and said variable pressure is varied in a pump delivery-decreasing sense.

5. For an internal combustion engine having a pump for delivering fuel thereto, said pump having means for varying the delivery thereof, a shaft connecting said engine to a variable pitch propeller, and means for varying the propeller pitch and thereby varying the torque transmitted by said shaft; fuel and torque control apparatus comprising: a source of hydraulic fluid under pressure, means for creating a motor pressure in said fluid, motor means for controlling said fuel delivery varying means in response to said motor pressure; means operatively associated with said motor means for regulating said motor pressure over a predetermined range of values, conduit means connecting said source and said pitch-varying means for supplying fluid thereto at a control pressure; means connected to said conduit means for regulating said control pressure over a range of values substantially different from the range of said motor pressures; a passage connecting said motor means at a point therein subject to said motor pressure with said conduit means at a point therein subject to said control pressure; and governor means connected to said passage for controlling the flow thru said passage in response to engine speed and adapted when said speed exceeds a predetermined value to vary said control pressure in a torque-increasing sense and to vary said motor pressure in a pump delivery-decreasing sense.

6. For an internal combustion engine having a pump for delivering fuel thereto, said pump having means for varying the delivery thereof, a shaft connecting said engine to a variable load, and means responsive to a control pressure for varying said load and thereby varying the torque transmitted by said shaft as a direct function of said control pressure; fuel and torque control apparatus comprising: a source of hydraulic fluid, motor means for controlling said fuel delivery varying means in response to a variable pressure in said fluid, means associated with said motor means for regulating said variable pressure over a predetermined range of values; a conduit means connecting said source and said load-varying means for supplying fluid to the latter at a control pressure; means for regulating said control pressure over a range of values substantially different from said range of said variable pressure, passage means connecting said motor means at a point therein subject to said motor pressure and said conduit means at a point therein subject to said control pressure; and governor means for controlling the flow thru said passage means in response to engine speed and adapted when said speed departs in one direction from a predetermined value to vary said control pressure and said variable pressure in opposite senses, so as to vary said torque and said fuel pump delivery in the proper respective directions to restore said speed to said predetermined value.

7. For an internal combustion engine having a pump for delivering fuel thereto, said pump having means for varying the delivery thereof, a shaft connecting said engine to a variable load, and means for varying said load and thereby varying the torque transmitted by said shaft; fuel and torque control apparatus comprising: first and second sources of hydraulic fluid at relatively low and high pressures, respectively; a first conduit connected to said first source, a second conduit connected to said second source, a third conduit connected to said load-varying means, control means for regulating a control pressure in said third conduit, said load-varying means being directly responsive to said control pressure; a motor means for controlling said fuel delivery varying means, a fourth conduit connected to said motor means, said motor means being responsive to the pressure in said fourth conduit; governor means responsive to the engine speed; first, second, third, and fourth connections between said governor means and said first, second, third and fourth conduits, respectively, for the flow of fluid from at least one of said conduits to at least one other of said conduits; said governor means being effective to regulate said motor pressure and, when the engine speed exceeds a predetermined value, to permit flow of fluid from said fourth conduit to said first conduit thereby reducing said motor pressure and hence the fuel flow; said governor means being simultaneously effective when the engine speed temporarily exceeds said predetermined value to permit flow of fluid from said second conduit to said third conduit thereby temporarily increasing said control pressure and hence said torque; whereby said torque is a predetermined function of the operation of said control means and said speed, and whereby the fuel flow is a predetermined function of said speed and torque.

8. For an internal combustion engine having an air compressor and a fuel pump for delivering combustion air and fuel thereto, said pump having means for varying the delivery thereof, a shaft connecting said engine to a variable load, hydraulic means responsive to a control pressure for varying said load and thereby varying the torque transmitted by said shaft as a direct function of said control pressure, and a control lever; fuel and torque control apparatus comprising: first and second regions of hydraulic fluid at relatively low and high pressures, respectively; control means responsive to the compressor discharge pressure in said engine for regulating said control pressure, a third region of fluid at a motor pressure, said fuel delivery varying means being responsive to said motor pressure; first manually operated means and thermal control means responsive to a temperature in the engine for modifying the regulation of said control pressure by said control means; governor means connected to said first, said second, and said third regions and to a source of said control pressure, said governor means being responsive to the engine speed and effective to maintain a predetermined value of engine speed at the value of said torque corresponding to the value of said control pressure, by regulating the flow of fluid between said third region and at least one of said first and second regions and said source of said control pressure; second manually operated means for varying said predetermined value of speed, and a connection between said first and second manually operated means and said control lever; whereby said torque is a function of said compressor discharge pressure, said temperature, and the operation of said control lever; whereby the fuel flow is a function of said speed, said torque, and the operation of said control lever; and whereby said control lever is operable thru predetermined intervals in which the engine torque, the engine speed, or both said torque and said speed are varied in response to movement of said control lever.

9. For an internal combustion engine having an incorporated air compressor and a fuel pump operated by said engine for delivering combustion air and fuel, respectively, thereto, said pump having means for varying the delivery thereof; fuel control apparatus comprising: a conduit for the flow of compressed air from said engine, first means responsive to the pressure in a portion of said conduit for controlling said fuel delivery varying means, and second means for modifying said pressure when a predetermined value of temperature is exceeded; whereby the fuel flow is a function of said air pressure and the operation of said second means.

10. For an internal combustion engine having a compressor for delivering combustion air thereto, a shaft connecting said engine to a variable load, and means for varying said load and thereby varying the torque transmitted by said shaft; torque control apparatus comprising: a conduit for the flow of compressed air from said engine, first means responsive to the pressure in a portion of said conduit for controlling said load-varying means, and second means modifying said pressure when a predetermined value of temperature is exceeded, whereby the engine torque is a function of said air pressure and the operation of said second means.

11. For an internal combustion engine having a pump for delivering fuel thereto, said pump having means for varying the delivery thereof, a shaft connecting said engine to a variable load, and means for varying said load and thereby varying the torque transmitted by said shaft; fuel and torque control apparatus comprising: a conduit for the flow of air from said engine, valve means responsive to the engine speed; first means, responsive to the pressure in a portion of said conduit for controlling said fuel delivery varying means; second means, responsive to said pressure and to said valve means, for controlling said load-varying means; and third means for modifying said pressure when a predetermined value of temperature is exceeded; whereby the fuel flow and the engine torque are functions of said air pressure and/or said speed, and said pressure being subject to modification as a function of the engine temperature.

12. For an internal combustion engine having an incorporated air compressor and means for delivering fuel to said engine, a fuel and torque control apparatus comprising: means for controlling the fuel flow to said engine, means for controlling the output torque of said engine, and means responsive to a compressed air pressure in said engine, for coordinately regulating both the fuel flow control means and the output torque control means so that the engine will operate at predetermined related values of speed and torque, under varying operating conditions.

13. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at a selected substantially constant speed and varying torque, under varying operating conditions.

14. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at a selected substantially constant torque and varying speed, under varying operating conditions.

15. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at desired related values of speed and torque, under varying operating conditions.

16. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at a selected substantially constant speed and varying torque, under varying operating conditions, throughout an engine operating range between minimum permissible engine speed and a predetermined intermediate speed.

17. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at a selected substantially constant torque and varying speed, under varying operating conditions, throughout an engine operating range between a torque slightly greater than the permissible minimum and a maximum torque corresponding to maximum brake-horsepower of the engine.

18. For an internal combustion engine having means for delivering compressed air and fuel thereto, a fuel and torque control apparatus comprising: means for controlling the fuel flow to said engine, means for controlling the output torque of said engine, and means, responsive to engine speed and to an air pressure in said engine which varies proportionally to the rate of mass air flow through said engine, for coordinately regulating both the fuel flow control means and the output torque control means so that the engine will operate at desired related values of speed and torque, under varying operating conditions, throughout a predetermined intermediate engine operating range.

19. For an internal combustion engine having a pump for delivering fuel thereto, a said pump including means for varying its delivery, a fuel and torque control apparatus comprising: an hydraulic motor for regulating the fuel delivery means of said pump; an hydraulic pressure regulator, responsive to an air pressure in said engine which varies as a selected function of the rate of mass air flow through said engine, for controlling the torque of said engine; and a governor mechanism, responsive to engine speed, connected to and adapted to so act upon said pump delivery means and regulator that the engine will operate at desired related values of speed and torque, under varying operating conditions.

20. A fuel and torque control apparatus according to claim 19, wherein said governor mechanism is also responsive to a manual control lever, whereby the torque and/or speed of the engine corresponds to the position of said lever.

21. A fuel and torque control apparatus according to claim 19, including a thermal control pressure regulator is responsive to an air pressure in said engine which varies proportionally with the rate of mass air flow through said engine, whereby the fuel supply to said engine varies proportionally with the air supply thereto.

22. A fuel and torque control apparatus according to claim 19, wherein said torque control pressure regulator is responsive to an air pressure in said engine which varies proportionally with the density of the atmosphere outside said engine, whereby the operation of said control apparatus is compensated for variations in atmospheric density.

23. A fuel and torque control apparatus according to claim 19 including, a thermal control device operatively connected to said torque control pressure regulator and responsive to the temperature of the combustion gases in said engine, for modifying the action of said regulator so that the speed of the engine is so regulated that the temperature of the engine never exceeds a maximum permissible value.

24. For an internal combustion engine, connected by a shaft to a variable pitch propeller having means for varying its pitch, said engine having a fuel pump with means for varying its delivery to said engine; combined fuel and torque control apparatus comprising: first means, responsive to the difference between the actual torque and a desired torque of said shaft, and operatively connected to said pitch varying means and to said fuel delivery varying means, said first means being adapted to vary the operation of said fuel delivery varying means, and regulate the operation of said pitch-varying means so as to maintain equality between said actual and desired torques; second means, responsive to engine speed and operatively connected to said first means, for modifying the action of said first means so as to simultaneously increase said actual torque and decrease said fuel delivery, thereby decreasing said engine speed, when said speed exceeds a predetermined value, and conversely increasing said engine speed when it falls below said value, whereby said actual shaft torque is a desired function of the operation of said first means and said engine speed is substantially constant.

References Cited in the file of this patent

UNITED STATES PATENTS

| Number | Name | Date |
|---|---|---|
| 2,187,120 | Gosslau et al. | Jan. 16, 1940 |
| 2,303,998 | Holley | Dec. 1, 1942 |
| 2,322,303 | Martin | June 22, 1943 |
| 2,391,323 | Martin | Dec. 18, 1945 |
| 2,403,371 | Ifield et al. | July 2, 1946 |
| 2,405,888 | Holley | Aug. 13, 1946 |
| 2,414,322 | Mock | Jan. 14, 1947 |
| 2,424,035 | Ifield | July 15, 1947 |
| 2,429,005 | Watson et al. | Oct. 14, 1947 |
| 2,447,267 | Mock | Aug. 17, 1948 |
| 2,450,535 | Watson et al. | Oct. 5, 1948 |
| 2,457,595 | Orr | Dec. 28, 1948 |
| 2,525,460 | Roesch | Oct. 10, 1950 |